W. W. WYTHE.
Pneumatic Railroad Speed-Indicators.
No. 198,233. Patented Dec. 18, 1877.
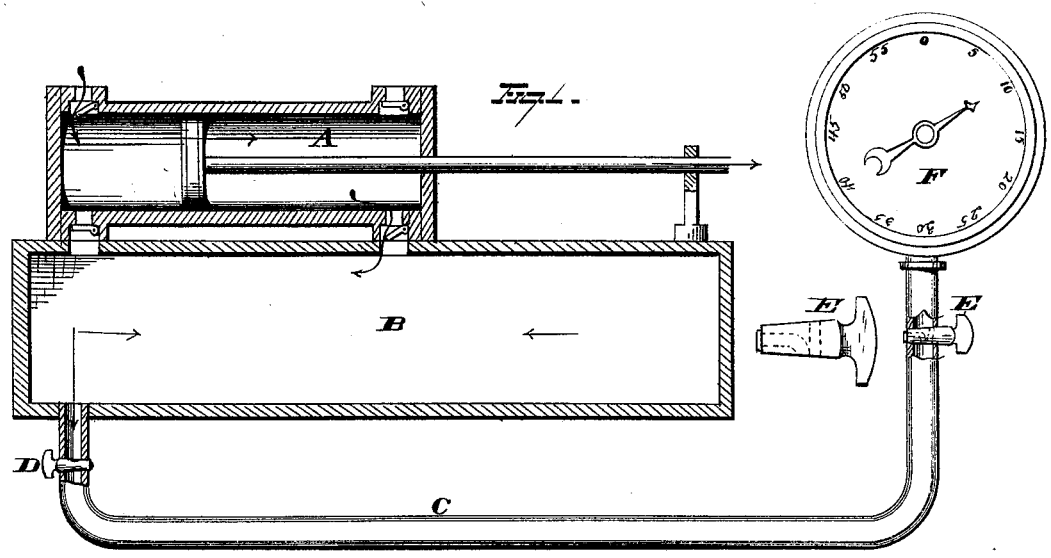
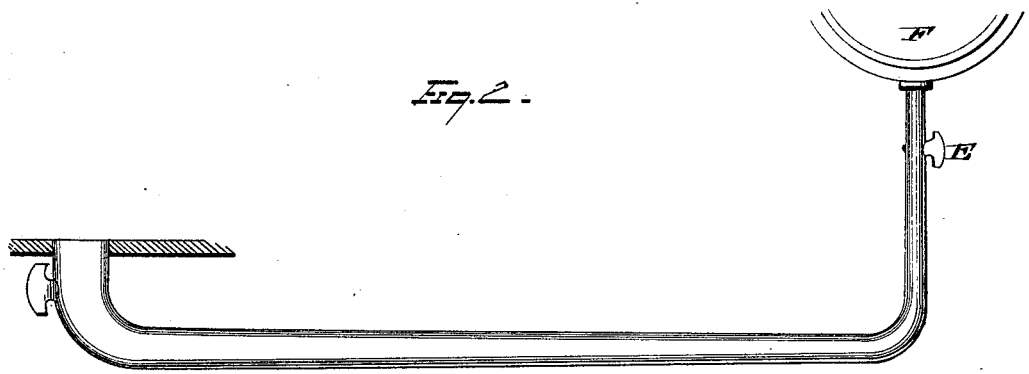
WITNESSES
Ed. I. Nottingham
A. W. Bright.
INVENTOR
W. W. Wythe.
By Leggett and Leggett,
ATTORNEYS.

UNITED STATES PATENT OFFICE.

WILLIAM W. WYTHE, OF ERIE, PENNSYLVANIA.

IMPROVEMENT IN PNEUMATIC RAILROAD SPEED-INDICATORS.

Specification forming part of Letters Patent No. 198,233, dated December 18, 1877; application filed May 5, 1877.

*To all whom it may concern:*

Be it known that I, WILLIAM W. WYTHE, of Erie, in the county of Erie and State of Pennsylvania, have invented certain new and useful Improvements in Railroad Speed-Indicators; and I do hereby declare the following to be a full, clear, and exact description of the invention, such as will enable others skilled in the art to which it pertains to make and use it, reference being had to the accompanying drawings, which form part of this specification.

My invention relates to speed-indicators for use upon vehicles of travel, especially upon locomotives and cars, or for the purpose of indicating the speed of shafting.

It consists, essentially, of an air-compressing-pump driven by the wheels or moving parts of a locomotive or car, of a chamber for the reception of compressed air, of a gage, and of a tube for connecting said gage and said chamber for containing the compressed air.

In the drawings, Figure 1 represents a view of a speed-indicator embodying my invention. part in section and part in side elevation. Fig. 2 is a modification of the same.

A is any suitable pump for compressing air. This pump is driven by any suitable connection with the axle of a locomotive or car, or with any of the moving parts thereof—as, for instance, the piston. B is a chamber, into which air is compressed by the pump A. From the chamber B leads a tube, C. At or near the junction of the tube C and chamber B is a gage-cock, D. E is a relief-cock at or near the junction of the tube and the gage F. The gage F may be of any suitable construction for indicating any degree of pressure.

Operation: The motion of a car or locomotive is imparted to the pump A by any suitable connections, giving it its motion, and determining the force of its action. When the locomotive is moving, the pump will be operated, and will act to compress air within the chamber B. This compressed air escapes through the tube, and the uniformity of its pressure within said chamber is preserved and the pulsations of the pump neutralized by a suitable adjustment of the gage-cock D. The compressed air is carried through the tube and its force expended upon the gage or indicator F. The air passing through the cock D and tube C escapes under pressure from the relief-cock E, and the degree of pressure of the escaping air is indicated by the gage F.

By this arrangement the degree of pressure will always correspond with the speed of the vehicle, as the pump delivers a constant volume of air at each stroke.

As the velocity of the locomotive increases, the speed of the pump will be correspondingly increased, and the degree of compression of air within the chamber B and gage F will be correspondingly increased; and to this gage F, for indicating the degree of air-pressure, a suitable scale should be fixed, that shall indicate the speed of the vehicle or shaft.

Thus it will appear that the speed at which the locomotive is traveling will be at all times shown by the gage F.

What I claim is—

1. A speed-indicator operated by compressed air, and consisting of an air-compressing pump and air-pressure gage, the two suitably connected, and in combination with a locomotive, car, or other vehicle, or shaft, substantially as described.

2. In combination with a vehicle or shaft, an air-compressing pump, and a gage or indicator connected therewith, suitable devices for neutralizing the pulsations, located between said pump and gage or indicator, and a vent for the escape of the air under pressure, substantially as and for the purposes described.

3. In combination with a locomotive, car, or other vehicle, or shaft, the pump A, chamber B, tube C, gage-cock D, relief-cock E, and gage or indicator F, substantially as and for the purposes described.

In testimony whereof I have signed my name to this specification in the presence of two subscribing witnesses.

WILLIAM W. WYTHE.

Witnesses:
FRANCIS TOUMEY,
THOMAS B. HALL.